(12) United States Patent
Shen et al.

(10) Patent No.: US 10,521,648 B2
(45) Date of Patent: Dec. 31, 2019

(54) BODY INFORMATION ANALYSIS APPARATUS AND METHOD OF AUXILIARY COMPARISON OF EYEBROW SHAPES THEREOF

(71) Applicant: CAL-COMP BIG DATA, INC., New Taipei (TW)

(72) Inventors: Shyh-Yong Shen, New Taipei (TW); Min-Chang Chi, New Taipei (TW); Eric Budiman Gosno, Id (ID)

(73) Assignee: CAL-COMP BIG DATA, INC., New Taipei (TW)

( * ) Notice: Subject to any disclaimer, the term of this patent is extended or adjusted under 35 U.S.C. 154(b) by 137 days.

(21) Appl. No.: 15/870,984

(22) Filed: Jan. 14, 2018

(65) Prior Publication Data
US 2019/0095696 A1 Mar. 28, 2019

(30) Foreign Application Priority Data

Sep. 28, 2017 (CN) .......................... 2017 1 0896760

(51) Int. Cl.
*G06K 9/00* (2006.01)
*G06T 7/80* (2017.01)
(Continued)

(52) U.S. Cl.
CPC ..... *G06K 9/00248* (2013.01); *G06K 9/00261* (2013.01); *G06K 9/00912* (2013.01);
(Continued)

(58) Field of Classification Search
CPC .. G06K 9/00248; G06K 9/52; G06K 9/00912; G06K 9/00261; G06T 7/11; G06T 7/80; G06T 11/60
(Continued)

(56) References Cited

U.S. PATENT DOCUMENTS 7,460,693 B2 * 12/2008 Loy .................... G06K 9/00221
382/103

7,515,773 B2 * 4/2009 Adachi .............. G06K 9/00248
382/181
(Continued)

FOREIGN PATENT DOCUMENTS

EP 0984386 A2 3/2000
EP 1865443 A2 12/2007
(Continued)

OTHER PUBLICATIONS

Office Action dated Dec. 18, 2018 of the corresponding Japan patent application.
(Continued)

*Primary Examiner* — Jerome Grant, II
(74) *Attorney, Agent, or Firm* — Chun-Ming Shih; HDLS IPR Services

(57) ABSTRACT

A body information analysis apparatus (1) and a method of auxiliary comparison of eyebrow shapes thereof are provided. The method includes following steps of: capturing a face image (51-53); recognizing an eyebrow image (71-76) in the face image (51-53); generating a mirror eyebrow shape pattern (71',73') according to the eyebrow image (71-76); calculating a projection position of the mirror eyebrow shape pattern (71',73') based on a symmetrical auxiliary line (81,82) and a position of the eyebrow image (71-76); and, displaying the face image (51-53) and the mirror eyebrow shape pattern (71',73') at the projection position. Therefore, by displaying the eyebrow image (71-76) of the user and the suggested mirror eyebrow pattern (71',73') simultaneously, the user can do the eyebrow-shaping intuitively and accurately, and the technical threshold of eyebrow-shaping can be reduced significantly, and a probability of shaping eyebrows successfully can be increased as well.

10 Claims, 13 Drawing Sheets

(51) Int. Cl.
　　　*G06T 7/11*　　　(2017.01)
　　　*G06K 9/52*　　　(2006.01)
(52) U.S. Cl.
　　　CPC .................. *G06K 9/52* (2013.01); *G06T 7/11*
　　　　　　　　　　　　(2017.01); *G06T 7/80* (2017.01)
(58) Field of Classification Search
　　　USPC ........................................................ 382/118
　　　See application file for complete search history.

(56) References Cited

U.S. PATENT DOCUMENTS

| | | | |
|---|---|---|---|
| 2006/0045382 A1* | 3/2006 | Adachi .............. | G06K 9/00248 382/291 |
| 2007/0047761 A1* | 3/2007 | Wasilunas ............ | A45D 44/005 382/100 |
| 2016/0042224 A1 | 2/2016 | Liu et al. | |
| 2018/0271257 A1* | 9/2018 | Shlomov ................... | G06T 7/68 |

FOREIGN PATENT DOCUMENTS

| | | | |
|---|---|---|---|
| JP | 2009213751 A | 9/2009 | |
| JP | 2012128597 A | 7/2012 | |
| JP | 2013158481 A | 8/2013 | |
| WO | 2014037915 A1 | 3/2014 | |

OTHER PUBLICATIONS

Search Report dated Oct. 22, 2018 of the corresponding European patent application.

* cited by examiner

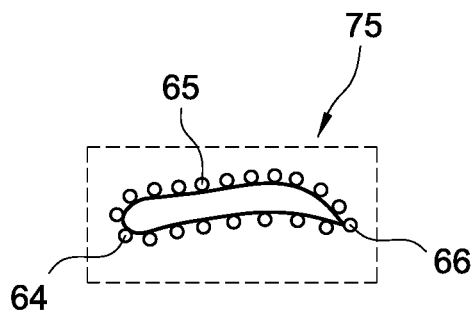
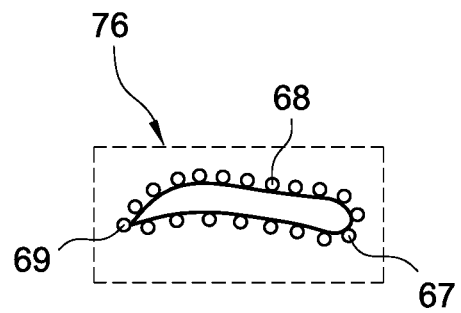
FIG.12A   FIG.12B
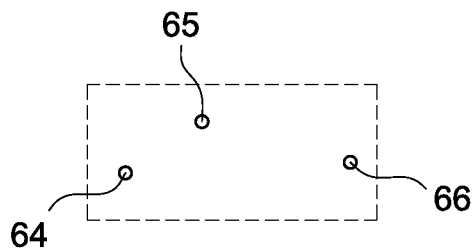
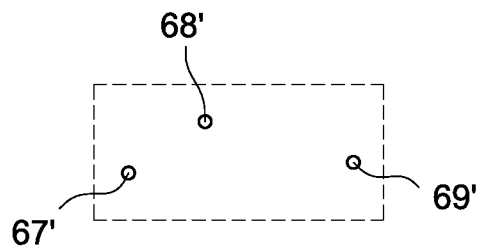
FIG.12C   FIG.12D
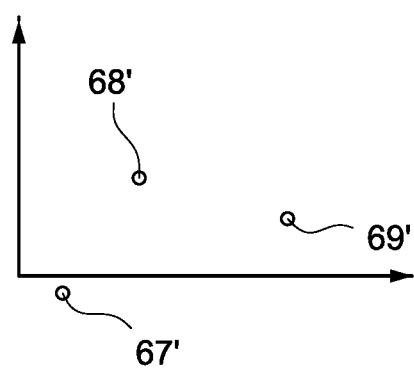
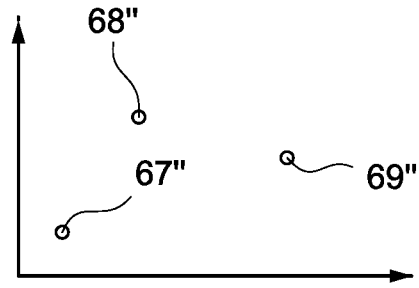
FIG.13A   FIG.13B

BODY INFORMATION ANALYSIS APPARATUS AND METHOD OF AUXILIARY COMPARISON OF EYEBROW SHAPES THEREOF

BACKGROUND OF THE INVENTION

Field of the Invention

The technical field relates to apparatus and method, and more particularly related to body information analysis apparatus and method of auxiliary comparison of eyebrow shapes thereof.

Description of Related Art

Eyebrow-shaping is one of the highly skilled makeup skills. A perfect eyebrow-shaping has ability of changing a visual effect of a people's face shape and improving an appearance impression of the people.

Besides, a judgment reference about the eyebrow-shaping being successful or not is whether the eyebrow shapes of a left eyebrow and a right eyebrow are symmetrical with each other.

In general, users shape their eyebrows by themselves when sitting in front of a mirror, or shapes their eyebrows via replacing the mirror with a camera and a screen of a smart phone.

However, when shaping their eyebrows, the users must imagine the shaped eyebrows and shape their eyebrows according to the imaginary eyebrow shape. As a result, the users having the poor eyebrow-shaping skill usually feel troubled about a speed of shaping their eyebrows being too slow or their shaped left eyebrow and shaped right eyebrow being not symmetrical with each other.

Accordingly, there is currently a need for an auxiliary apparatus having ability of assisting the inexperienced users in eyebrow-shaping efficiently.

SUMMARY OF THE INVENTION

The present disclosed example is directed to a body information analysis apparatus and a method of auxiliary comparison of eyebrow shapes, the apparatus and the method have ability of assisting the user in comparing a current eyebrow shape with a suggested eyebrow shape when eyebrow-shaping.

One of the exemplary embodiments, a method of auxiliary comparison of eyebrow shapes applied to a body information analysis apparatus, comprises following steps of: controlling an image capture module of the body information analysis apparatus to capture a face image; controlling a process unit of the body information analysis apparatus to recognize an eyebrow image on one side of the face image; generating a mirror eyebrow shape pattern according to the recognized eyebrow image at the process unit; calculating a projection position of the mirror eyebrow shape pattern based on a symmetrical auxiliary line of the face image according to a position of the eyebrow image at the process unit, wherein the projection position is located at another side of the face image referred to the symmetrical auxiliary line; and, controlling a display module of the body information analysis apparatus to display the face image and display the mirror eyebrow shape pattern at the projection position simultaneously.

One of the exemplary embodiments, a body information analysis apparatus, comprises an image capture module, a display module and a process unit. The image capture module is used to capture a face image. The display module is used to display the face image and display a mirror eyebrow shape pattern at a projection position simultaneously. The process unit is electrically connected to the image capture module and the display module, the process unit recognizes an eyebrow image on one side of the face image, generates the mirror eyebrow shape pattern according to the recognized eyebrow image, and calculates the projection position of the mirror eyebrow shape pattern based on a symmetrical auxiliary line of the face image according to a position of the eyebrow image, wherein the projection position is located at another side of the face image referred to the symmetrical auxiliary line.

The present disclosed example can assist the user in intuitive and accurate eyebrow-shaping, reduce the technical threshold of eyebrow-shaping significantly, and increase a probability of shaping eyebrows successfully via displaying the eyebrow image of the user and the suggested mirror eyebrow shape pattern simultaneously.

BRIEF DESCRIPTION OF DRAWING

The features of the present disclosed example believed to be novel are set forth with particularity in the appended claims. The present disclosed example itself, however, may be best understood by reference to the following detailed description of the present disclosed example, which describes an exemplary embodiment of the present disclosed example, taken in conjunction with the accompanying drawings, in which:

FIG. 12A is a first schematic view of eyebrow shape recognition according to the third embodiment of the present disclosed example;

FIG. 12B is a second schematic view of eyebrow shape recognition according to the third embodiment of the present disclosed example;

FIG. 12C is a third schematic view of eyebrow shape recognition according to the third embodiment of the present disclosed example;

FIG. 12D is a fourth schematic view of eyebrow shape recognition according to the third embodiment of the present disclosed example;

FIG. 13A is a schematic view of a projection position before adjustment according to the fourth embodiment of the present disclosed example;

FIG. 13B is a schematic view of a projection position after adjustment according to the fourth embodiment of the present disclosed example;

DETAILED DESCRIPTION OF THE INVENTION

In cooperation with attached drawings, the technical contents and detailed description of the present disclosed example are described thereinafter according to a preferable embodiment, being not used to limit its executing scope. Any equivalent variation and modification made according to appended claims is all covered by the claims claimed by the present disclosed example.

The present disclosed example disclosed a body information analysis apparatus 1 (referred to as analysis apparatus 1 in following description), the analysis apparatus is mainly used to perform a method of auxiliary comparison of eyebrow shapes (referred to as comparison method in following description) for assisting a user in comparing a current eyebrow shape with a suggested eyebrow shape and shaping his/her eyebrows.

Figure 1:
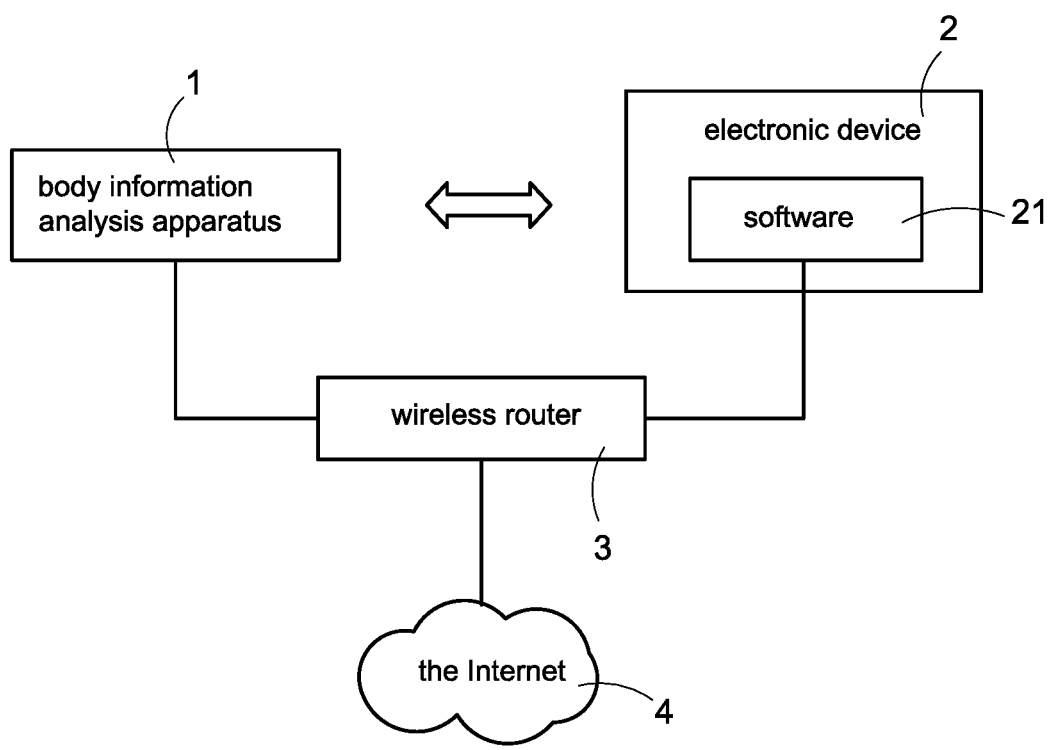
FIG. 1 is an architecture diagram of a system according to the first embodiment of the present disclosed example.

Please refer to FIG. 1 which is an architecture diagram of a system according to the first embodiment of the present disclosed example. In the embodiment shown in FIG. 1, the user may operate an electronic device 2 to configure the analysis apparatus 1.

More specifically, there is a software 21 installed in a memory (not shown in figure) of the electronic device 2. The software 21 (such as an application program developed and provided by a manufacturer of the analysis apparatus 1) is used to control the electronic device 2 to establish a connection with the analysis apparatus 1. Besides, the user may operate the software 21 to input various configuration operations, such as inputting the user's data, registering the user's face image, configuring various default values and so forth.

Figure 4:
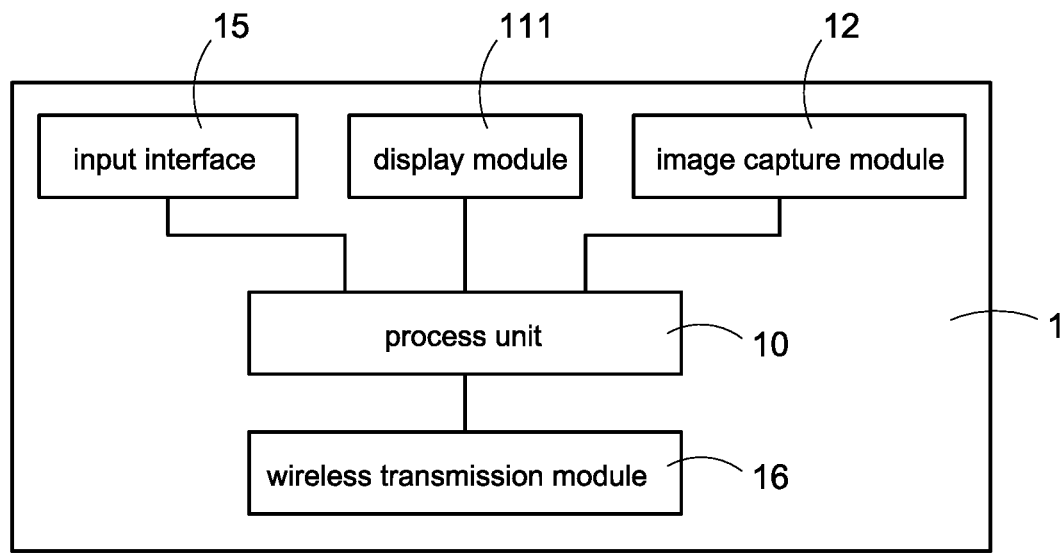
FIG. 4 is an architecture diagram of a body information analysis apparatus according to the first embodiment of the present disclosed example.

One of the exemplary embodiments, the user may directly operate an input interface of the analysis apparatus 1, such as an input interface 15 shown in FIG. 4, to input various configuration operations.

One of the exemplary embodiments, a wireless transmission module 16 of the analysis apparatus 1 may implement the data transmission with the electronic device 2 via Wi-Fi communication technology, Bluetooth communication technology, Zig-bee communication technology, radio frequency (RF) communication technology, infrared communication technology, fiber-optic communication technology, voice communication technology and/or the other wireless communication technologies.

One of the exemplary embodiments, the analysis apparatus 1 may connect to a wireless router 3 located in the same region for connecting to the Internet 4 via the wireless router 3. Thus, the analysis apparatus 1 may execute the operation of updating its firmware, uploading data, downloading data and so forth via the Internet 4. Besides, the analysis apparatus 1 may further transfer the user's body information, such as face image, eyebrow image, mirror eyebrow shape pattern and so forth described later, to a remote computer equipment (not shown in figure) via the Internet 4 for making the user have ability of viewing the information remotely, or achieving the purpose of remote replication.

Figure 2:
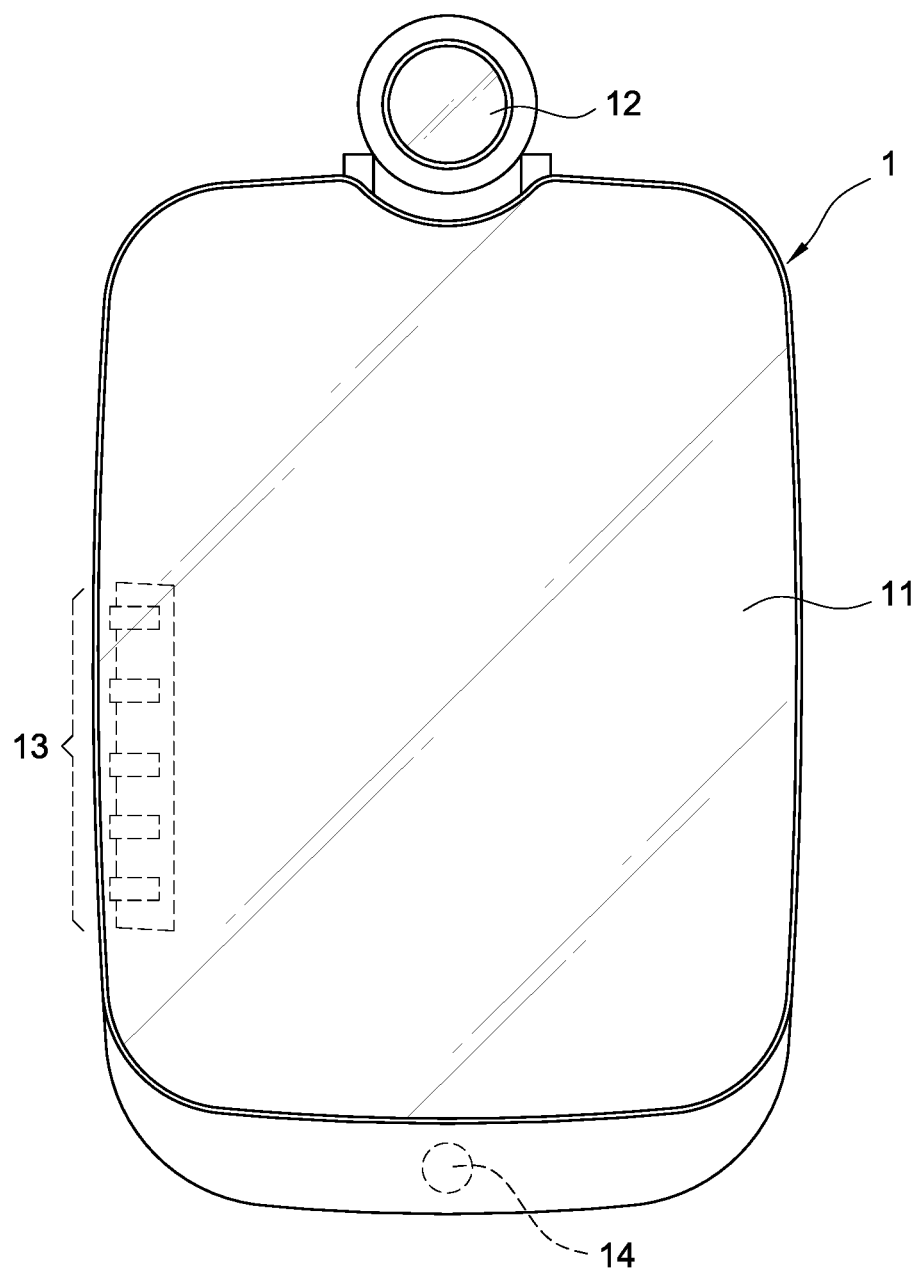
FIG. 2 is a first schematic view of a body information analysis apparatus according to the present disclosed example.
Figure 3:
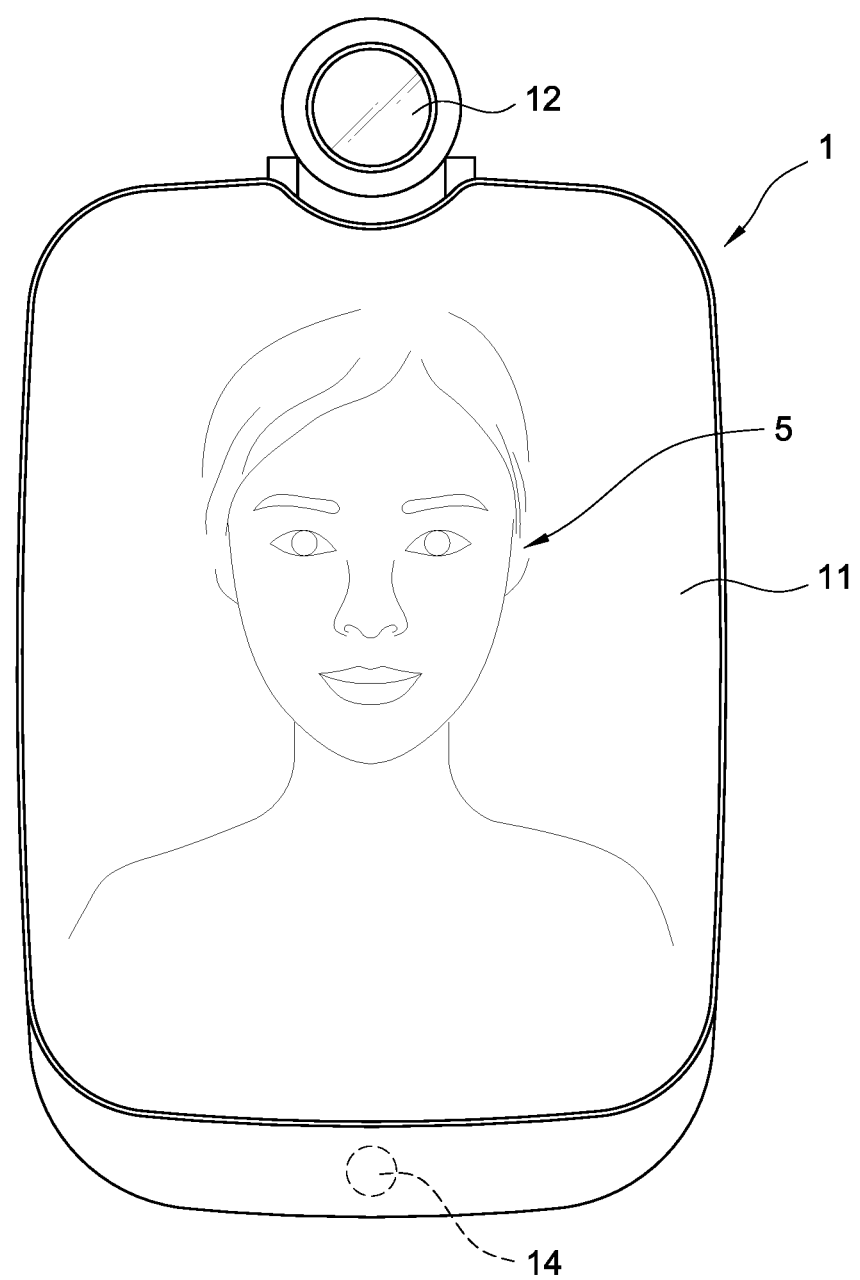
FIG. 3 is a second schematic view of a body information analysis apparatus according to the present disclosed example.

Please refer to FIG. 2 and FIG. 3 simultaneously, FIG. 2 is a first schematic view of a body information analysis apparatus according to the present disclosed example, FIG. 3 is a second schematic view of a body information analysis apparatus according to the present disclosed example. The analysis apparatus 1 shown in FIG. 2 and FIG. 3 is mainly arranged in bedroom or restroom of the user's home for leading the user to accept a detection and analysis of body information, such as face, neck or hands.

The analysis apparatus 1 comprises a mirror screen 11. The analysis apparatus 1 may display a graphical user interface (GUI) via the mirror screen 11 after booting (as shown in FIG. 2), and may interact with the user via the displayed GUI. Moreover, the mirror screen 11 may be used as a simple mirror for reflecting an optical mirror image 5 of the user after shutting down (as shown in FIG. 3).

The present disclosed example mainly assists the user to make up, such as eyebrow-shaping, via the analysis apparatus 1. For achieving this purpose, the mirror screen 11 may display the GUI and reflect the optical mirror image 5 of the user simultaneously for analyzing the user's makeup and assisting the user (described later) during the user making up.

One of the exemplary embodiments, the analysis apparatus further comprises an image capture module 12 arranged on the analysis apparatus 1. A shooting angle of the image capture module 12 is adjustable. One of the exemplary embodiments, the image capture module 12 is used to shoot the user for obtaining one or more high resolution image(s), such as face image(s), neck image(s), hand image(s) and so forth. The analysis apparatus 1 may analyze the body information of the user and a progress of makeup via the captured image(s). One of the exemplary embodiments, the image capture module 12 may capture an external message, such as one-dimension barcode, two-dimensional barcode and so forth, for retrieving the corresponded data via a content of the external message.

Besides, the analysis apparatus 1 is configured to immediately display image captured by the image capture module 12 on the mirror screen 11. Thus, even the mirror screen 11 doesn't be power off, the user may immediately see the user's electronic mirror image 5 on the mirror screen 11.

Furthermore, the analysis apparatus 1 may immediately process the captured image, such as rendering a mark (For example, a mirror eyebrow shape pattern described later) or a set of indication graph(s) and/or indication text(s) for assisting the user in eyebrow-shaping, and display the rendered image on the mirror screen 11.

Thus, the analysis apparatus 1 can display the auxiliary information on the mirror display 11 immediately and intuitively via Augmented Reality (AR) technology when the user makes up, and effectively improve the user experience.

One of the exemplary embodiments, the mirror screen 11 may be a touch screen, the user may operate the analysis apparatus 1 for inputting data via the mirror screen 11.

The analysis apparatus 1 may further comprise a plurality of keys 13. In this embodiment, the keys 13 may be physical buttons or touch keys, but this specific example is not intended to limit the scope of the present disclosed example. The user may operate the GUI (such as controlling the GUI to trigger a command of going back to the homepage, going back to the previous webpage or going to the next webpage) or quickly control the analysis apparatus 1 to implement the function (such as turning on the mirror screen 11, turning off the mirror screen 11, enabling the image capture module 12 and so forth) corresponding to the hot keys via pressing the keys 13

The analysis apparatus 1 may further comprise one or more sensor(s) 14 (such as temperature sensor, humidity sensor and so forth) used to sensing environmental data of an environment which the analysis apparatus 1 is arranged. Thus, the present disclosed example can improve the accuracy of detection and analysis of the user's body information generated by the analysis apparatus 1. One of the exemplary embodiments, above-mentioned sensor 14 may be a motion sensor, the analysis apparatus 1 may sense a motion gesture (such as waving left, waving right, waving up, waving down, reaching forward, withdrawing hand back and so forth) of the user via the motion sensor. Therefore, the user may input a data-inputting operation to the analysis apparatus 1 via inputting motion gesture without touching the mirror screen 11 or keys 13, and prevent form residue of fingerprints.

Please refer to FIG. 4, which is an architecture diagram of a body information analysis apparatus according to the first embodiment of the present disclosed example. As shown in FIG. 4, the analysis apparatus 1 mainly comprises a display module 111, image capture module 12, input interface 15, wireless transmission module 16, and a process unit 10 electrically connected to above-mentioned devices.

One of the exemplary embodiments, the image capture module 12 is a camera or a video recorder and is used to capture an external image (such as a face image of the user) and/or an external message. The analysis apparatus 1 may recognize an image of the user (such as eyebrow recognition, face recognition, neck recognition, hand recognition and so forth) in the external image for analyzing a part (such as eyebrows, face, neck or hands) of the user or executing a corresponding operation according to a content of the external message.

The display module 111 is configured to display above-mentioned GUI. One of the exemplary embodiments, the display module 111 is arranged in the mirror screen 11. When the display module 111 is enabled, light of the display module 111 may be transmitted though the unidirectional glass (not shown in figure) of the mirror screen 11 and project on the eyes of the user, so as to making the user have ability of seeing the GUI on the mirror screen 11. When the display module 111 is disabled, the user only has ability of seeing the user's optical mirror image 5 on the mirror screen 11. One of the exemplary embodiments, the analysis apparatus 1 may further adjust an intensity of the light source or range of a display region for making the mirror screen 11 has ability of reflection of the user's optical mirror image 5 and displaying the GUI simultaneously.

The analysis apparatus 1 receives the user's external input via the input interface 15. Thus, the user may interact with the GUI or input a desired configuration operation. One of the exemplary embodiments, the input interface 15 may be above-mentioned sensor 14 used to sense the gesture input of the user. One of the exemplary embodiments, the input interface 15 may be above-mentioned image capture module 12 used to capture the external image or the external message. One of the exemplary embodiments, the input interface 15 may be a microphone used to receive an external audio.

The wireless transmission module 16 is used to connect to the Internet 4. More specifically, the user may operate electronic device 2 to connect to the analysis apparatus 1 remotely via the Internet 4 for viewing the various information (such as body information) recorded by the analysis apparatus 1 at any time.

The process unit 10 is connected to the display module 111, the image capture module 12, the input interface 15 and the wireless transmission module 16. The process unit 10 has ability of executing the computer-executable codes (not shown in figure) stored in a memory. The process unit 10 may further implement the method of comparison of the present disclosed example via the execution of the computer-executable codes.

Figure 5:
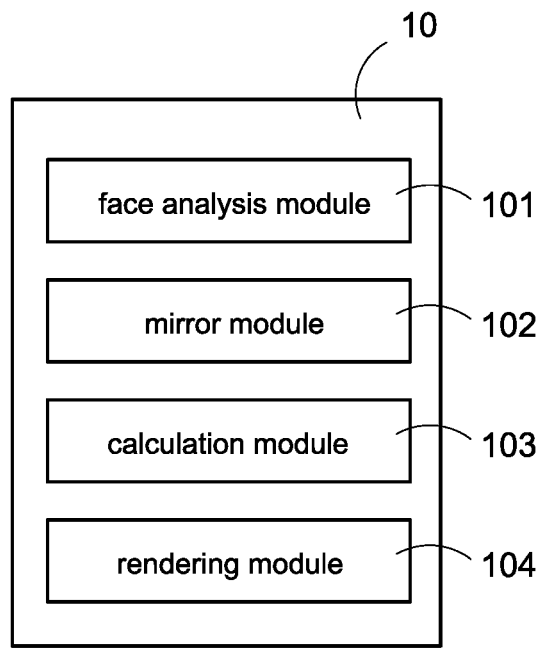
FIG. 5 is a schematic view of a process unit according to the first embodiment of the present disclosed example.

Please refer to FIG. 5, which is a schematic view of a process unit according to the first embodiment of the present disclosed example. More specifically, the process unit 10 mainly implement each function of the method of comparison of the present disclosed example via the execution of the computer-executable codes. Moreover, above-mentioned computer-executable codes may be divided into following function modules according to the different functions.

Figure 9:
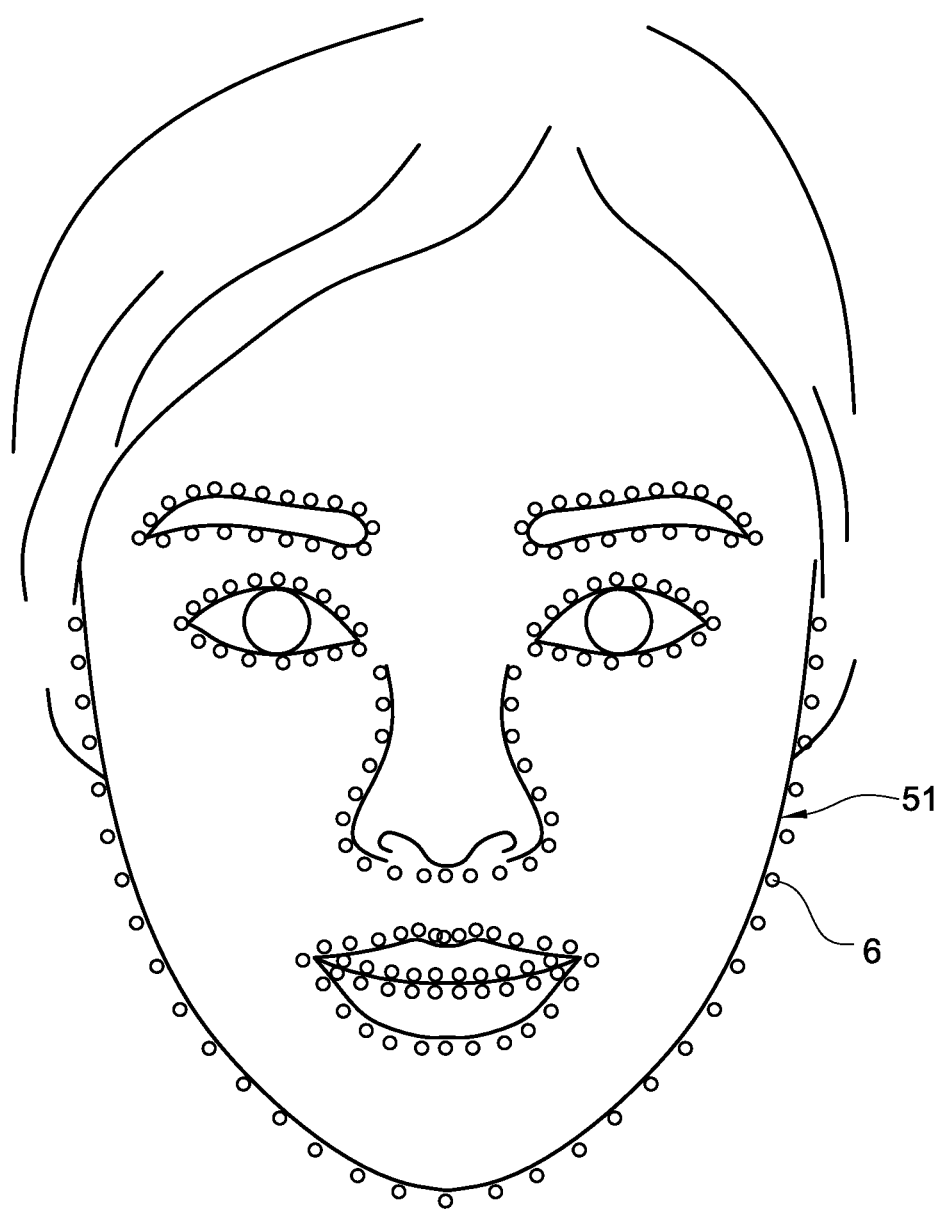
FIG. 9 is a schematic view of face analysis according to the present disclosed example.

1. face analysis module 101, the face analysis module 101 is used to execute a face analysis process to the face image captured by the image capture module 12. More specifically, the face analysis module 101 may recognize image of each part (such as eyebrow image, eye image, nose image, ear image, mouth image and so forth) of the face in the face image. One of the exemplary embodiments, the face analysis module 101 may executes the face analysis process to the face image for recognizing a plurality of feature points (as shown in FIG. 9) of each part of the face. Moreover, the feature points of each part correspond to the different features of each part (such as eyebrow head, eyebrow peak and eyebrow tail of the eyebrows, nose bridge, nose head or nose wings of the nose, or eye head or eye tail of the eyes) of the face.

2. mirror module 102, the mirror module 102 is used to execute a mirror process to the feature points of the specific part located at one side of a symmetrical auxiliary line (such as one of the eyebrows, one of the eyes, left half or right half of the nose, one of the ears, left half or right half of the month or the other part with symmetrical appearance) for obtaining a plurality of mirror feature points (61',67'-69'), wherein the mirror feature points respectively located at another side of the symmetrical auxiliary line. The obtained mirror feature points respectively correspond to the feature points of the specific part.

3. calculation module 103, the calculation module 103 is used to calculate the symmetrical auxiliary line of the face image and calculate a suggested projection position of a projection pattern of above-mentioned specific part. The position projection position is located at another side of the symmetrical auxiliary line.

4. rendering module 104, the rendering module 104 is used to render above-mentioned projection pattern.

One of the exemplary embodiments, the face analysis module 101 recognizes a plurality of eyebrow feature points of one side of the eyebrow images (such as left eyebrow image) of the face image. The mirror module 102 executes the mirror process to the eyebrow feature points for obtaining the mirror feature points. The calculation module 103 calculates the symmetrical auxiliary line, and calculates the projection position according to the symmetrical auxiliary line and the mirror feature points. The projection position and the eyebrow feature points are respectively located at the different sides of the symmetrical auxiliary line. The rendering module 104 renders a mirror eyebrow shape pattern at the projection position according to the mirror feature points.

Thus, the present disclosed example can render the symmetrical part located at one side (such as right eyebrow) according to the symmetrical part located at another side (such as left eyebrow) of the face image, and project the rendered symmetrical part at an appropriate position. Thus, the user can makeup according to the projected symmetrical part.

Figure 6:
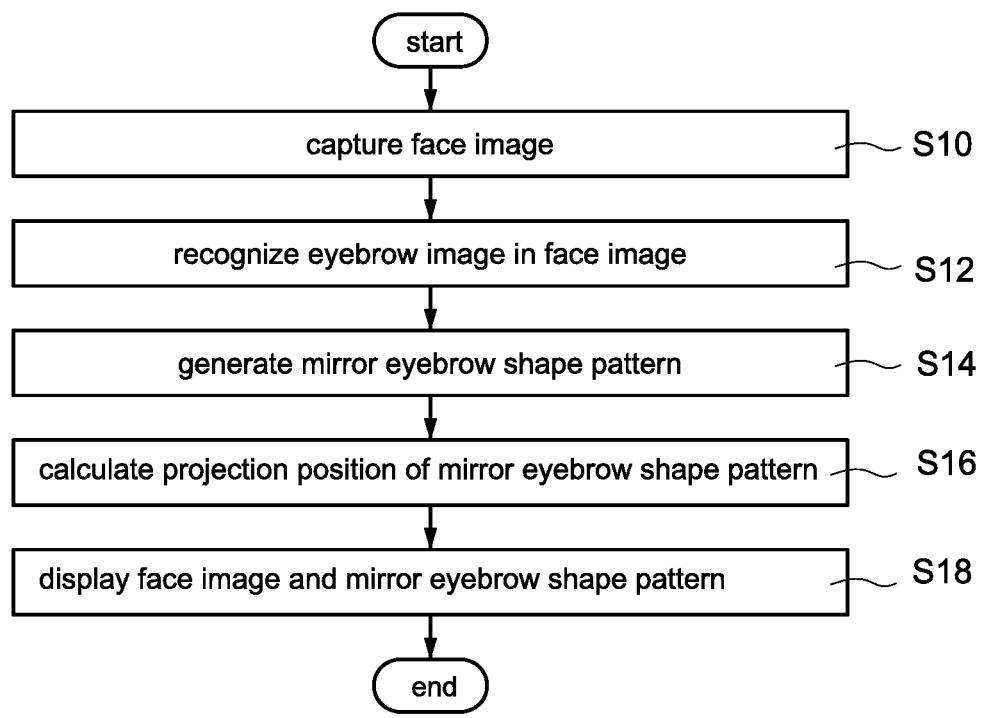
FIG. 6 is a flowchart of a method of auxiliary comparison of eyebrow shapes according to the first embodiment of the present disclosed example.

Please refer to FIG. 6, which is a flowchart of a method of auxiliary comparison of eyebrow shapes according to the first embodiment of the present disclosed example. The analysis apparatus 1 of the present disclosed example performs each step of the method of the comparison of each embodiment of the present disclosed example via controlling the process unit 10 to execute above-mentioned computer-executable codes (such as above-mentioned function module 101-104).

The method of comparison of this embodiment comprises following steps for implementing the function of auxiliary comparison of eyebrow shapes.

Step S10: the process unit 10 of the analysis apparatus 1 controls the image capture module 12 to shoot the face of the user for capturing the face image (such as the face image 51 shown in FIG. 9) of the user.

Step S12: the process unit 10 executes the face analysis process to the captured face image 51 for recognizing the eyebrow image(s) in the face image 51.

One of the exemplary embodiments, the process unit 10 only recognizes one eyebrow image (such as left eyebrow image) located at one side (such as left side) of the face image 51, but this specific example is not intended to limit the scope of the present disclosed example. One of the exemplary embodiments, the process unit 10 may recognizes both eyebrow images (right eyebrow image and left eyebrow image) respectively located at both sides of the face image 51, and selects one of both eyebrow images for process.

One of the exemplary embodiments, the process unit 10 analyzes the face image 51 via the face analysis module 101 for recognizing a plurality of parts (such as face contour, eyes, eyebrows, nose, mouth, ears and the other parts of face) of the face, and select one of both eyebrow images for process.

One of the exemplary embodiments, above-mentioned face analysis process is configured to analyze the face image 51 via execution of the Face Landmark Algorithm for determining a position of the specific part of face in the face image 51, but this specific example is not intended to limit the scope of the present disclosed example. Furthermore, above-mentioned Face Landmark Algorithm is implemented by the Dlib Library.

Please refer to FIG. 9, which is a schematic view of face analysis according to the present disclosed example. During execution of face analysis process, the face analysis module 101 first analyzes the face image 51 via execution of above-mentioned Face Landmark Algorithm. Above-mentioned Face Landmark Algorithm is a commonly technology in the art of the present disclosed example. The Face Landmark Algorithm is used to analyze the face in the face image 51 based on Machine Learning technology for recognizing a plurality of feature points 6 (such as eyebrow peak and eyebrow head, eye tail and eye head, nose bridge and nose wind, pinna and earlobe, and so forth, the number of the feature points 6 may be 68 or 198) of one or more specific part(s) (such as eyebrows, eyes, nose or ears) of the face. Moreover, above-mentioned Face Landmark Algorithm may further mark a plurality of marks of the feature points 6 of the specific part(s) on the face image 51.

One of the exemplary embodiments, the face analysis module 101 may number each feature point 6 according to the part and the feature corresponding to each feature point 6.

Thus, the present disclosed example can determine the position of each part of the face in the face image 51 according to the information of numbers, shapes, sorts and so forth of the feature points.

Please refer to FIG. 6 again. A step S12 is next performed. Step S14: the process unit 10 generates a mirror eyebrow shape pattern according to the recognized/selected eyebrow image via the mirror module 102 and the rendering module 104.

One of the exemplary embodiments, the mirror module 102 first executes the mirror process to the feature points of the recognized/selected eyebrow image (such as left eyebrow image) for obtaining a plurality of mirror feature points. Then, the rendering module 104 renders the mirror eyebrow shape pattern according to the mirror feature points.

One of the exemplary embodiments, the process unit 10 may calculate a symmetrical auxiliary line of the face image 51 via the calculation module 103, and generate the mirror eyebrow shape pattern based on the calculated symmetrical auxiliary line via the mirror module 102 and the rendering module 104.

Step S16: the process unit 10 calculate a projection position of the mirror eyebrow shape pattern in the face image 51 refer to the symmetrical auxiliary line according to the position of the eyebrow image. One of the exemplary embodiments, the projection position and the eyebrow feature points of the eyebrow image are respectively located at both sides of the face image 51. Namely, the projection position and the eyebrow feature points of the eyebrow image are respectively located at the different sides of the symmetrical auxiliary line.

Step S18: the process unit 10 controls the display module 111 to display the captured face image 51 and display the display the mirror eyebrow shape pattern at the calculated projection position simultaneously. The mirror eyebrow shape pattern overlaps the face image 51 because of above-mentioned projection position being located at the face image 51. One of the exemplary embodiments, the mirror eyebrow shape pattern is displayed upon the face image 51, and the mirror eyebrow shape pattern blocks a part of the face image 51. One of the exemplary embodiments, the process unit 10 further executes an image process for removing the image of original eyebrow of the user and leaving the mirror eyebrow shape pattern in the face image 51.

Figure 10A:
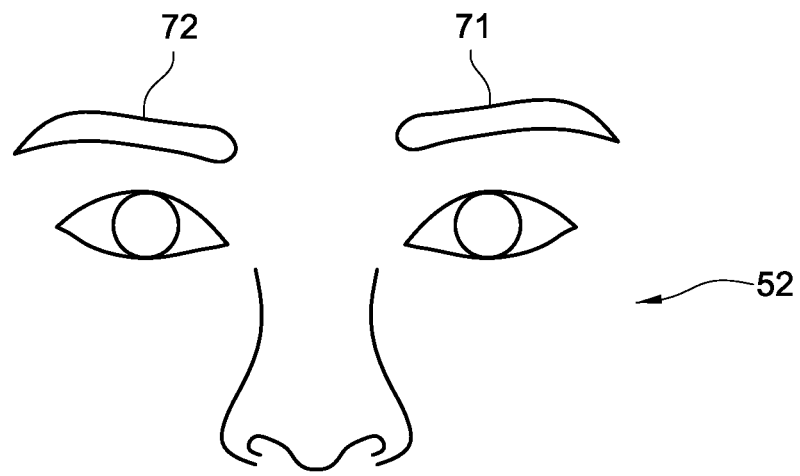
FIG. 10A is a first schematic view of auxiliary comparison of eyebrow shapes according to the first embodiment of the present disclosed example.
Figure 10B:
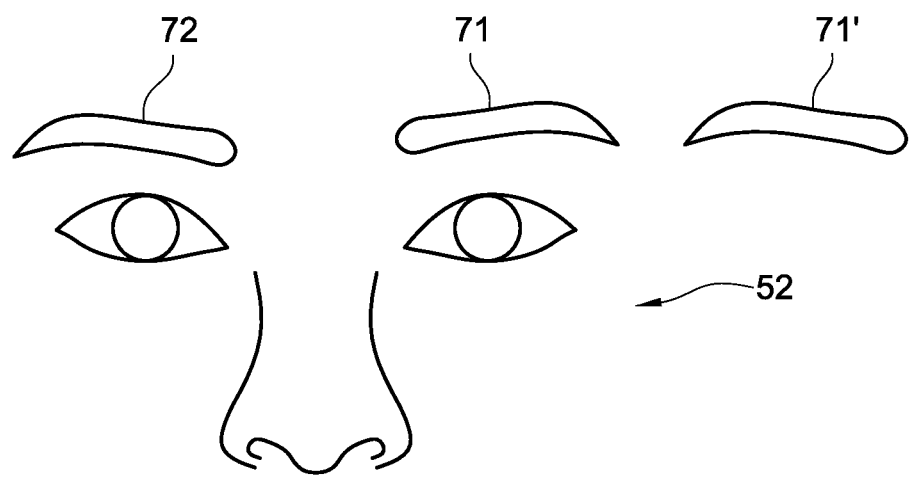
FIG. 10B is a second schematic view of auxiliary comparison of eyebrow shapes according to the first embodiment of the present disclosed example.
Figure 10C:
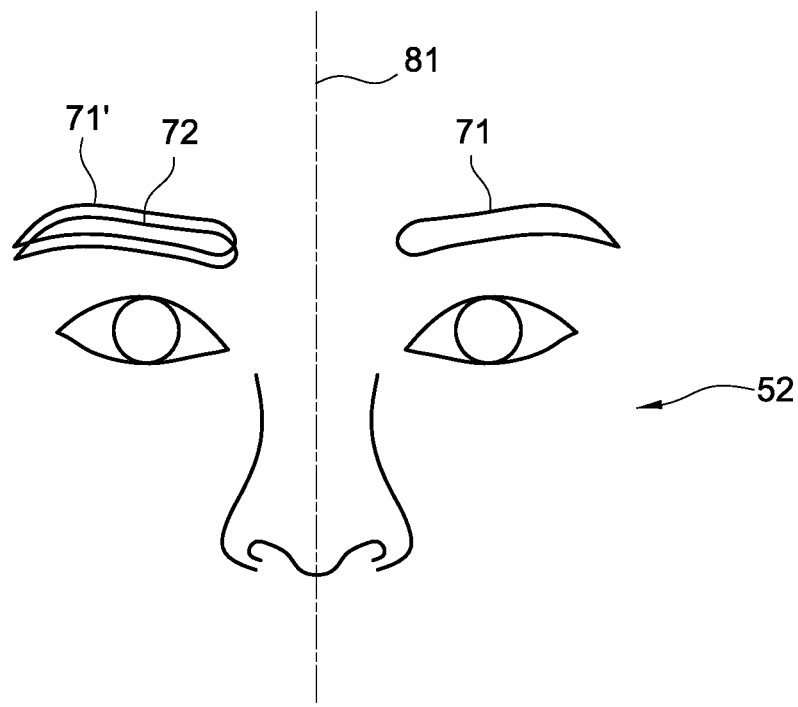
FIG. 10C is a third schematic view of auxiliary comparison of eyebrow shapes according to the first embodiment of the present disclosed example.

Please refer to FIG. 10A to FIG. 10C, FIG. 10A is a first schematic view of auxiliary comparison of eyebrow shapes according to the first embodiment of the present disclosed example, FIG. 10B is a second schematic view of auxiliary comparison of eyebrow shapes according to the first embodiment of the present disclosed example, FIG. 10C is a third schematic view of auxiliary comparison of eyebrow shapes according to the first embodiment of the present disclosed example. In this example, the user shapes the user's left eyebrow by taking the right eyebrow as the benchmark.

First, the analysis apparatus 1 captures the face image 52 (this example takes capturing a part of the face image for example, the face image 52 is an electronic mirror image opposite to the user. Namely, the image of left eyebrow of the face image 52 corresponds to the right eyebrow of the user in fact.), recognizes the right eyebrow image 71 corresponding to the right eyebrow of the user and the left eyebrow image 72 corresponding to the left eyebrow of the user, and selects the right eyebrow image 71 for process (as shown in FIG. 10A).

Then, the analysis apparatus 1 generate the mirror eyebrow shape pattern 71', calculates the symmetrical auxiliary line 81 of the face image 52 (as shown in FIG. 10B), and calculates the projection position based on the symmetrical auxiliary line 81 and the right eyebrow image 71. Finally, the analysis apparatus 1 displays the face image 52, and displays the mirror eyebrow shape pattern 71' at the projection position simultaneously (as shown in FIG. 10C).

Thus, the user can shape user's eyebrow via directly watching the analysis apparatus 1 according to the differences of the shape and the position between the left eyebrow image 72 and the mirror eyebrow shape pattern 71'. The present disclosed example can assist the user in intuitive and accurate eyebrow-shaping, and make the shaped left eyebrow is symmetrical with the right eyebrow.

One of the exemplary embodiments, the analysis apparatus 1 may performs the steps S10 to step S18 repeatedly and continuously for refreshing the display screen continuously during the function of auxiliary comparison of eyebrow shapes is enabled. Thus, the analysis apparatus 1 may display the mirror image of the user via the mirror screen 11 immediately. Moreover, because this embodiment may re-calculate the mirror eyebrow shape pattern 71' and its projection position continuously, the mirror eyebrow shape pattern 71' and its projection position in this embodiment may be changed as motion of the user.

For example, if the user moves toward left, the re-calculated projection position of the mirror eyebrow shape pattern 71' changes bias to left, so as to make the displayed mirror eyebrow shape pattern 71' keep be located at the fixed related position with the other parts of the face image 52. If the user moves in a direction close to the analyzer apparatus 1, the re-calculated size of the mirror eyebrow shape pattern 71' is enlarged correspondingly, so as to make the size of the displayed mirror eyebrow shape pattern 71' keep the fixed related ratio of the size of the other parts of the face image 52, and so on.

Thus, the user can see the real-time face image 52, the suggest mirror eyebrow shape pattern 71' and its projection position simultaneously on the mirror screen 11, shaping the user's eyebrows intuitive and accurate, reduce the technical threshold of eyebrow-shaping significantly, and increase a probability of shaping eyebrows successfully via displaying the eyebrow image of the user and the suggested mirror eyebrow shape pattern simultaneously.

Figure 7:
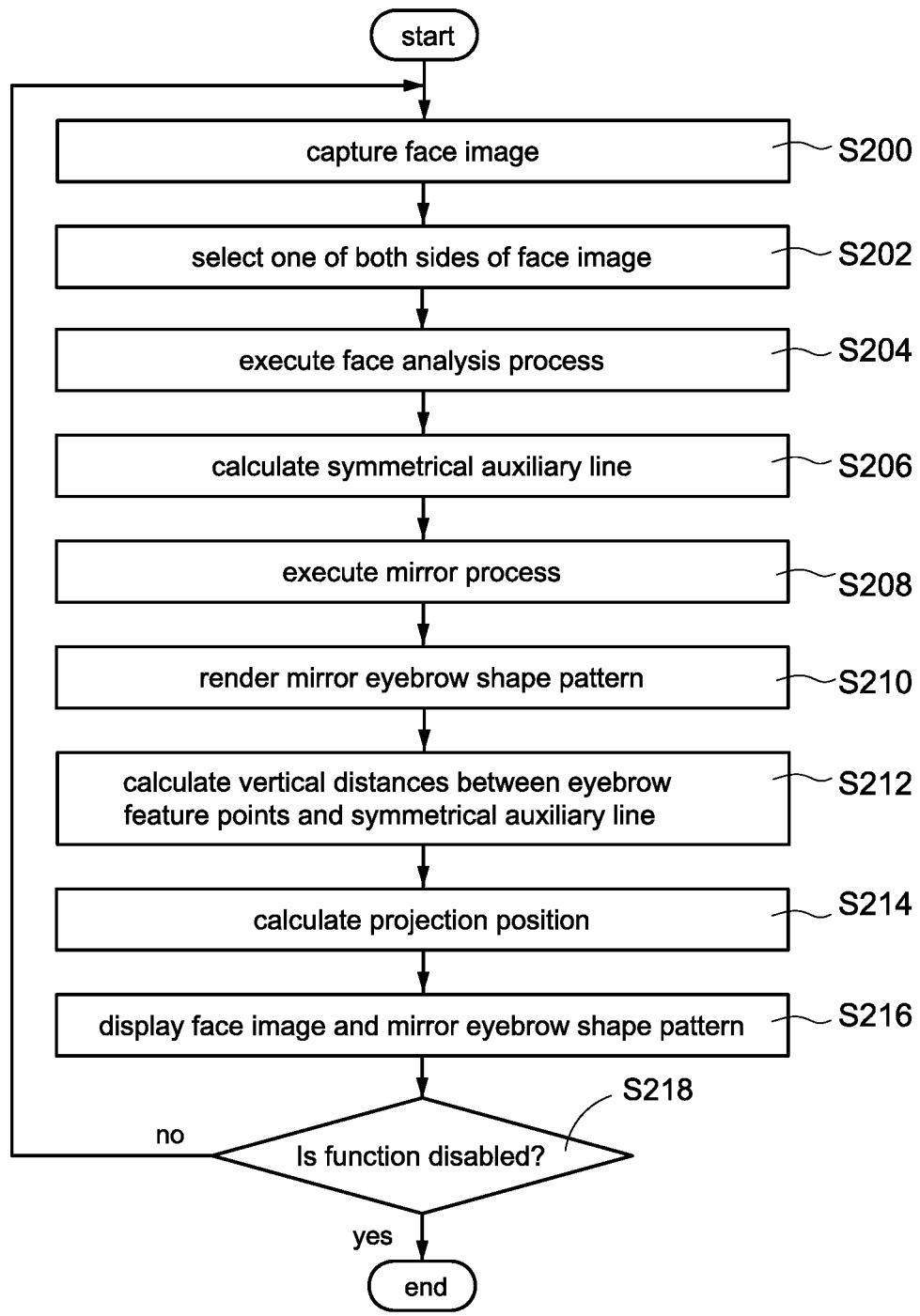
FIG. 7 is a flowchart of a method of auxiliary comparison of eyebrow shapes according to the second embodiment of the present disclosed example.
Figure 8:
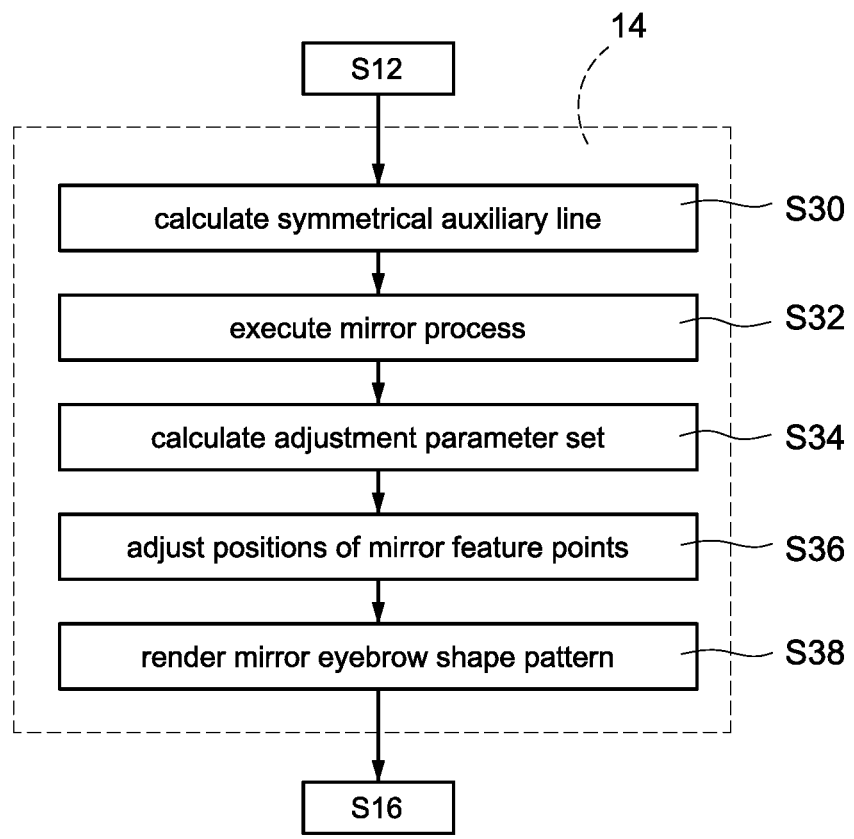
FIG. 8 is a partial flowchart of a method of auxiliary comparison of eyebrow shapes according to auxiliary comparison of eyebrow shapes according to the third embodiment of the present disclosed example.
Figure 11A:
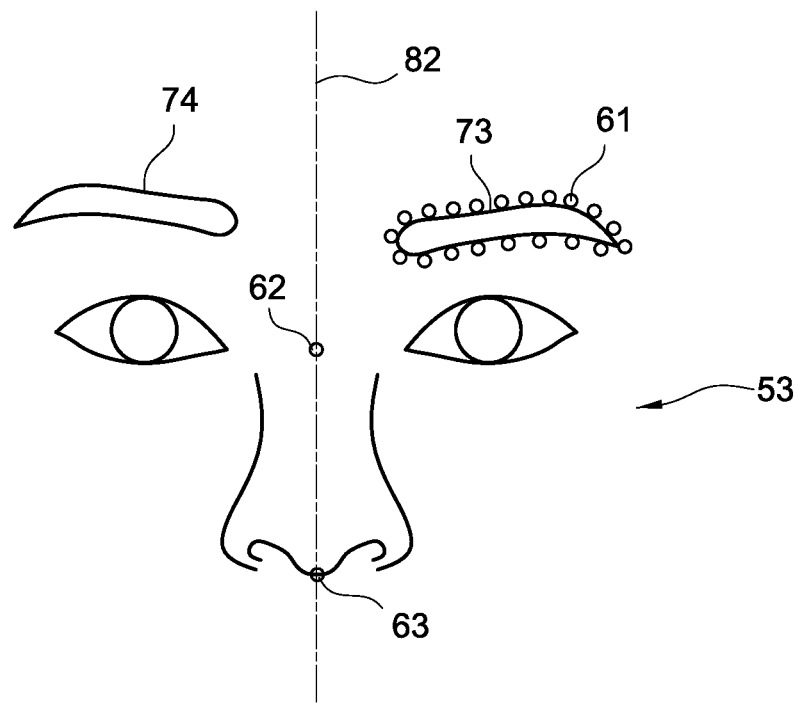
FIG. 11A is a first schematic view of auxiliary comparison of eyebrow shapes according to the second embodiment of the present disclosed example.
Figure 11B:
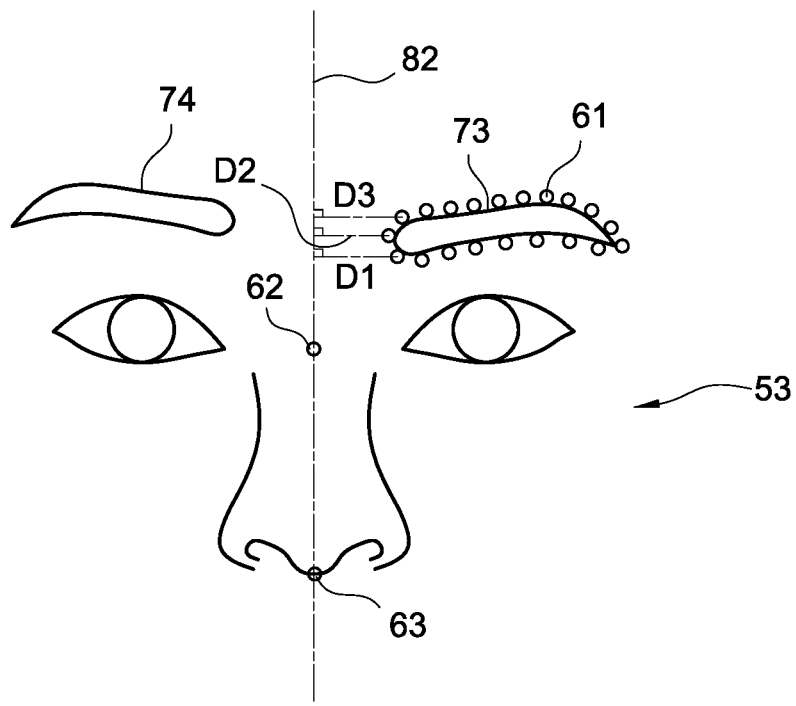
FIG. 11B is a second schematic view of auxiliary comparison of eyebrow shapes according to the second embodiment of the present disclosed example.
Figure 11C:
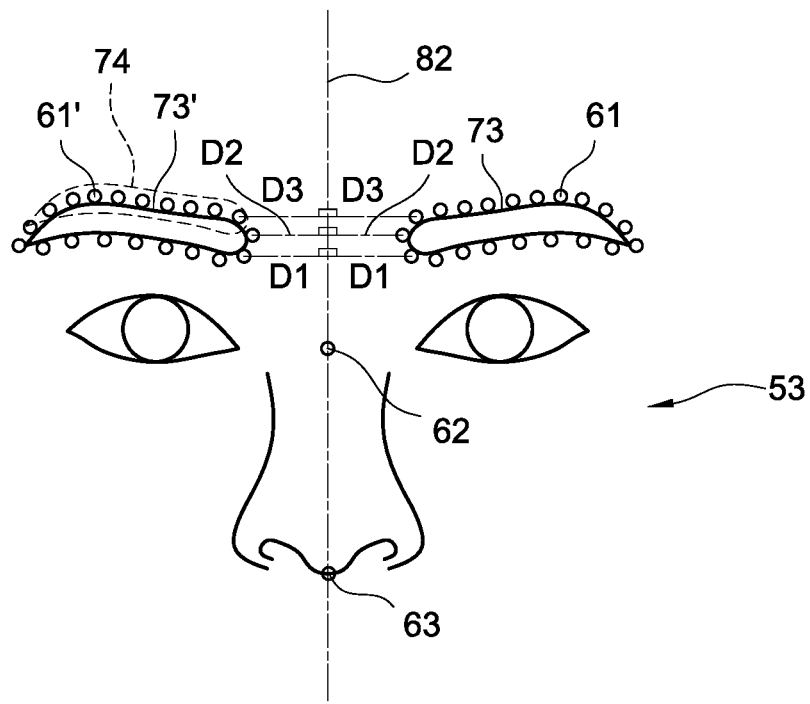
FIG. 11C is a third schematic view of auxiliary comparison of eyebrow shapes according to the second embodiment of the present disclosed example.

Please refer to FIG. 7 and FIG. 11A to FIG. 11C simultaneously, FIG. 7 is a flowchart of a method of auxiliary comparison of eyebrow shapes according to the second embodiment of the present disclosed example, FIG. 8 is a partial flowchart of a method of auxiliary comparison of eyebrow shapes according to auxiliary comparison of eyebrow shapes according to the third embodiment of the present disclosed example, FIG. 11A is a first schematic view of auxiliary comparison of eyebrow shapes according to the second embodiment of the present disclosed example, FIG. 11B is a second schematic view of auxiliary comparison of eyebrow shapes according to the second embodiment of the present disclosed example, FIG. 11C is a third schematic view of auxiliary comparison of eyebrow shapes according to the second embodiment of the present disclosed example. The method of comparison of this embodiment comprises following steps for implementing the function of auxiliary comparison of eyebrow shapes.

Step S200: the process unit 10 controls the image capture module 12 to shoot the user for retrieving the face image of the user.

Step S202: the process unit 10 selects one of both sides of the face image as the reference side. More specifically, the user may first shape his/her right eyebrow, and select the shaped right eyebrow as the reference side for continuing to shaping his/her left eyebrow via the analysis apparatus 1 after consummation of shaping the eyebrow, and vice versa.

One of the exemplary embodiments, the user may input a reference side selection operation via the input interface 15 of the analysis apparatus 1, wherein the reference side selection operation is to select one of both sides of the face image. One of the exemplary embodiments, the user may operate the electronic device 2 to send a reference side selection command to the wireless transmission module 16 of the analysis apparatus 1, wherein the reference side selection command is to select one of both sides of the face image. Then, the process unit 10 may select one of both sides of the face image as above-mentioned reference side according to the reference side selection operation or the reference side selection command.

Step S204: the process unit 10 executes the face analysis process to the face image for recognizing the feature points of one or more specific part(s) of the face via the face analysis module 101.

One of the exemplary embodiments, the face analysis module 101 recognizes a plurality of eyebrow feature points 61 (the first eyebrow feature points) of the right eyebrow image 73 (the first eyebrow image) and a plurality of eyebrow feature points (not shown in figure, hereinafter the second eyebrow feature points) of the left eyebrow image 74 (the second eyebrow image), selects the eyebrow image corresponding to the reference side (take selecting the right eyebrow image 73 for example). Then, the face analysis module 101 establishes an eyebrow data set (the first eyebrow data set) according to the first eyebrow feature points, and establishes another eyebrow data set (the second eyebrow data set) according to the second eyebrow feature points, wherein the first eyebrow feature points respectively correspond to the different features of the right eyebrow, and the second eyebrow feature points respectively correspond to the different features of the left eyebrow. Furthermore, three of the first eyebrow feature points respectively correspond to eyebrow head, eyebrow peak and eyebrow tail of the right eyebrow, and three of the second eyebrow feature points respectively correspond to eyebrow head, eyebrow peak and eyebrow tail of the left eyebrow.

One of the exemplary embodiments, the face analysis module 101 may further recognize a plurality of nose feature points of the nose image (the example shown in FIG. 11A takes configuring two nose feature points 62-63 for example, wherein the nose feature point 62 corresponds to the nose bridge of the nose, and the nose feature point 63 corresponds to the nose columella of the nose), and establish a nose data set according to the nose feature points. Above-mentioned nose feature points may be used to calculate the symmetrical auxiliary line 82.

Step S206: the process unit 10 calculates the symmetrical auxiliary line 82 according to the nose data set via the calculation module 103.

One of the exemplary embodiments, the calculation module 103 configures a straight line through the multiple feature points 62-63 of the nose data set as the symmetrical auxiliary line 82.

One of the exemplary embodiments, the calculation module 103 executes a calculation of Linear Regression to the nose feature points 62-63, and configures the calculated regression line as the symmetrical auxiliary line 82.

One of the exemplary embodiments, the calculation module 103 configures a central line of the face image as the symmetrical auxiliary line 82 directly.

Step S208: the process unit 10 execute the mirror process to the first eyebrow data set based on the symmetrical auxiliary line 82 via the mirror module 102 for obtaining a mirror data set comprising the arrangement relationship of a plurality of mirror feature points 61'.

One of the exemplary embodiments, the process unit 10 only generates the arrangement relationship of the mirror feature points 61' after execution of the mirror process, and doesn't generate the position of each mirror feature point 61'.

Step S210: the process unit 10 connects the mirror feature points 61' of the first eyebrow data set to render the mirror eyebrow shape pattern 73' via the rendering module 104.

Step S212: the process unit 10 calculates a plurality of vertical distances (the first vertical distances) between all or part of the eyebrow feature points 61 of the first eyebrow data set and the symmetrical auxiliary line 82.

Please refer to FIG. 11B, for example, the calculation module 103 may calculate a first vertical distance D1 between the first eyebrow feature point 61 and the symmetrical auxiliary line 82, a second vertical distance D2 between the second eyebrow feature point 61 and the symmetrical auxiliary line 82 and a third vertical distance D3 between the third eyebrow feature point 61 and the symmetrical auxiliary line 82, and so on.

Step S214: the process unit 10 configures a plurality of positions of the mirror feature points 61' located at another side of the symmetrical auxiliary line 82 according to the calculated vertical distances based on the symmetrical auxiliary line 82 via the mirror module 102, and calculates the projection position of the mirror eyebrow shape pattern 73' according to the configured mirror feature points 61'.

One of the exemplary embodiments, a plurality of vertical distances (the second vertical distances) between the configured mirror feature points 61' and the symmetrical auxiliary line 82 are consistent with the first vertical distances between the eyebrow feature points 61 and the symmetrical auxiliary line 82.

Please refer to FIG. 11C, for example, the second vertical distance between the first mirror feature point 61' and the symmetrical auxiliary line 82 is D1, the second vertical distance between the second mirror feature point 61' and the symmetrical auxiliary line 82 is D2, the second vertical distance between the third mirror feature point 61' and the symmetrical auxiliary line 82 is D3, and so on. Each second vertical distance is consistent with the corresponded first vertical distance.

One of the exemplary embodiments, a connection of each eyebrow feature point 61 and the corresponded mirror feature point 61' is perpendicular with the symmetrical auxiliary line 82. On the other hand, each eyebrow feature point 61 and the corresponded mirror feature point 61' in the face image are left-right symmetrical each other.

Please be noted that above-mentioned projection position may be a specific region or a single position of the face image.

One of the exemplary embodiments, the mirror module 102 configures the region enclosed by the mirror feature points 61' as the projection position, but this specific example is not intended to limit the scope of the present disclosed example.

One of the exemplary embodiments, the mirror module 102 may calculate a central point of the mirror feature points 61', and configure the central point as the projection position. One of the exemplary embodiments, the mirror module 102 may select one of the mirror feature points 61' (such as selecting the mirror feature point 61' corresponding to the eyebrow head), and configure the selected mirror feature point 61' as the projection position.

One of the exemplary embodiments, the steps S208-S214 may be perform with integration. More specifically, the process unit 10 may generate the mirror feature points 61' based on the symmetrical auxiliary line 82 and the calculated vertical distances, and directly configure the positions of the mirror feature points 61' located at another side of the symmetrical auxiliary line 82 (the arrangement relationship between the mirror feature points 61' can be inferred by the positions of the mirror feature points 61'). Then, the process unit 10 calculates the projection position according to the positions of the mirror feature points 61', and renders the mirror eyebrow shape pattern.

Step S216: the process unit 10 displays the face image 53 on the display module 111, and displays the mirror eyebrow shape pattern 73' at the projection position.

One of the exemplary embodiments, if the mirror module 102 configures the central point of the mirror feature points 61' as the projection position, the process unit 10 makes the central point of the mirror eyebrow shape pattern 73' align to the projection position and displays the mirror eyebrow shape pattern 73'.

One of the exemplary embodiments, if the mirror module 102 configures the region enclosed by the mirror feature points 61' as the projection position, the process unit 10 displays the mirror eyebrow shape pattern 73' in the enclosed region.

One of the exemplary embodiments, if the mirror module 102 selects one of the mirror feature points 61' as the projection position, the process unit 10 makes the specific part of the mirror eyebrow shape pattern 73' align to the projection position and displays the mirror eyebrow shape pattern 73'.

Step S218: the process unit 10 determines whether the user disables the function of auxiliary comparison of eyebrow shapes.

More specifically, the user may disable the function of auxiliary comparison of eyebrow shapes via the input interface 15 or the electronic device 2 after eyebrow-shaping.

If the process 10 determines that the function of auxiliary comparison of eyebrow shapes had been disabled, terminates the method of auxiliary comparison of eyebrow shapes. Otherwise, the process unit 10 performs the steps S200-S216 again.

The present disclosed example can effectively reduce the amount of calculation, improve process latency, and enhance display fluency via calculating the projection position according to the vertical distance. Moreover, the present disclosed example can make the user see his/her mirror image and the mirror eyebrow shape pattern on the mirror screen 11 immediately, and improve user experience.

In above-mentioned embodiments, the projection position of the mirror eyebrow shape pattern and the position of the eyebrow image located at the reference side are completely left-right symmetrical. Moreover, the range and shape of the mirror eyebrow shape pattern and the range and shape of the eyebrow image located at the reference side are completely left-right symmetrical.

However, each part of human face may be not completely symmetrical in general (for example, height of left eye may be different with height of right eye, nose bridge may be not completely symmetrical with the central line of face, and thickness or angle of left eyebrow may be different with thickness or angle of right eyebrow). If the user shapes his/her eyebrows according to the completely symmetrical mirror eyebrow shape pattern and the completely symmetrical projection position, the left eyebrow and the right eyebrow will be overly consistent with each other after eyebrow-shaping and look not natural enough.

For solve above-mentioned problem, the present disclosed example further provides a function of eyebrow modification having ability of adjustment of shape, angle or projection position of the mirror eyebrow shape pattern according to the shape, angle or position before eyebrow-shaping of the eyebrow, so as to make the shaped eyebrows look natural.

Figure 14A:
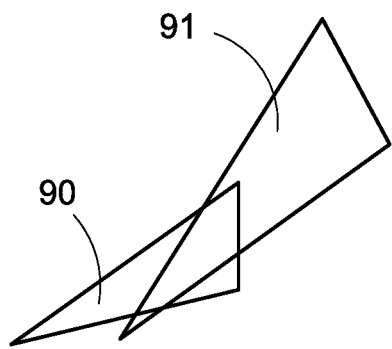
FIG. 14A is a schematic view of an eyebrow shape before adjustment according to the fifth embodiment of the present disclosed example.
Figure 14B:
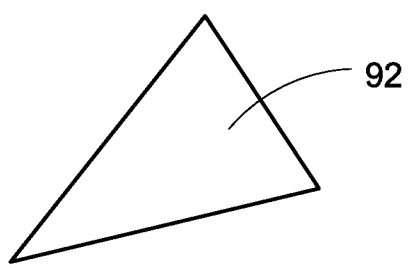
FIG. 14B is a schematic view of an eyebrow shape after adjustment according to the fifth embodiment of the present disclosed example.

Please refer to FIG. 6, FIG. 8, FIG. 12A to FIG. 14B, FIG. 8 is a partial flowchart of a method of auxiliary comparison of eyebrow shapes according to auxiliary comparison of eyebrow shapes according to the third embodiment of the present disclosed example, FIG. 12A is a first schematic view of eyebrow shape recognition according to the third embodiment of the present disclosed example, FIG. 12B is a second schematic view of eyebrow shape recognition according to the third embodiment of the present disclosed example, FIG. 12C is a third schematic view of eyebrow shape recognition according to the third embodiment of the present disclosed example, FIG. 12D is a fourth schematic view of eyebrow shape recognition according to the third embodiment of the present disclosed example, FIG. 13A is a schematic view of a projection position before adjustment according to the fourth embodiment of the present disclosed example, FIG. 13B is a schematic view of a projection position after adjustment according to the fourth embodiment of the present disclosed example, FIG. 14A is a schematic view of an eyebrow shape before adjustment according to the fifth embodiment of the present disclosed example, and FIG. 14B is a schematic view of an eyebrow shape after adjustment according to the fifth embodiment of the present disclosed example. Compare to the embodiment shown in FIG. 6, the step S14 of this embodiment comprises steps S30-S38.

In this embodiment, the second eyebrow data set corresponding to the second eyebrow image 76 (such as left eyebrow image) is configured as the reference for displaying the suggested mirror eyebrow shape pattern on another side (such as right side) of the face image, so as to make the user have ability of shaping his/her right eyebrow according to the displayed mirror eyebrow shape pattern.

In the step S14 of this embodiment, the process unit 10 executes the face analysis process to the face image via the face analysis module 101 to recognize the first eyebrow image 75 and the second eyebrow image 76 respectively located at both sides of the symmetrical auxiliary line, configure the first eyebrow feature points on the first eyebrow image 75 for establishing the first eyebrow data set (as shown in FIG. 12A), and configure the second eyebrow feature points on the second eyebrow image 76 for establishing the second eyebrow data set (as shown in FIG. 12B).

Moreover, in the step S16 of this embodiment, the process unit 10 configures the adjusted positions of the mirror feature points (described later) as the projection position via the calculation module 103.

One of the exemplary embodiments, three of the first eyebrow feature points 64-66 respectively correspond to eyebrow head, eyebrow peak and eyebrow tail of the user, and three of the second eyebrow feature points 67-69 respectively correspond to eyebrow head, eyebrow peak and eyebrow tail of the user. More specifically, the first eyebrow feature point 64 and the second eyebrow feature point 67 correspond to eyebrow head, the first eyebrow feature point 65 and the second eyebrow feature point 68 correspond to eyebrow peak, and the first eyebrow feature point 66 and the second eyebrow feature point 69 correspond to eyebrow tail.

Compare to the embodiment shown in FIG. 6, the step S14 of this embodiment comprises following steps.

Step S30: the process unit 10 calculates the symmetrical auxiliary line via the calculation module 103.

Step S32: the process unit 10 executes the mirror process to the second eyebrow feature points 67-69 of the second eyebrow data set based on the symmetrical auxiliary line for obtaining the mirror feature points 67'-69' (as shown in FIG. 12D). Besides, the process unit 10 doesn't execute the mirror process to the first eyebrow feature points 64-66 of the first eyebrow data set (as shown in FIG. 12C).

Step S34: the process unit 10 calculates an adjustment parameter set according to the mirror feature points 67'-69' and the second eyebrow data set as the reference via the calculation module 103.

One of the exemplary embodiments, above-mentioned adjustment parameter set comprises a translation parameter, a rotation parameter and a scaling parameter.

One of the exemplary embodiments, the calculation module 103 calculates above-mentioned adjustment parameter set by combination of the Rigid Registration system and the Least-Square Estimation Algorithm. The Rigid Registration system and the Least-Square Estimation Algorithm are the commonly technologies in the art of the present disclosed example. The Rigid Registration system and the Least-Square Estimation Algorithm may analyze two data (such as the first eyebrow feature points 64-66 and the mirror feature points 67'-69') and generate an adjustment parameter set according to a difference between the two data. After the calculated adjustment parameter set is used to execute a transformation process to one of the data (such as the mirror feature points 67'-69'), the transformed data has high similarity with another data.

Step S36: the process unit 10 adjusts the mirror feature points 67'-69' (as shown in FIG. 13A) according to the symmetrical auxiliary line and the calculated adjustment parameter set via the calculation module 103 for making the adjusted positions of the mirror feature points 67"-69" (as shown in FIG. 13B) are more similar as the first eyebrow feature points 64-66 corresponding to eyebrow not shaping.

One of the exemplary embodiments, the calculation module 103 transforms the positions of the mirror feature points 67'-69' for translating the pattern enclosed by the mirror feature points 67'-69' according to the translation parameter, transforms the positions of the mirror feature points 67'-69' for rotating the pattern enclosed by the mirror feature points 67'-69' according to the rotation parameter, transforms the positions of the mirror feature points 67'-69' for scaling the pattern enclosed by the mirror feature points 67'-69' according to the scaling parameter.

Please refer to FIG. 13A, FIG. 13B, FIG. 14A and FIG. 14B. As shown in figures, before transformation of positions according to the adjustment parameter set, there is a great difference between the pattern 90 enclosed by the mirror feature points 67'-69' and the pattern 91 enclosed by the first eyebrow feature points 64-66 (corresponding to the eyebrow not shaping). Above situation makes the user must shape his/her eyebrow significantly. Moreover, both eyebrows will be overly consistent with each other after eyebrow-shaping and look not natural enough.

After transformation of positions according to the adjustment parameter set, the pattern 92 enclosed by the transformed mirror feature points 67"-69" are more similar as the pattern 91. Above situation makes the user have not to shape his/her eyebrow significantly. Moreover, both shaped eyebrows look natural because of a slight difference between both shaped eyebrows.

Step S38: the process unit 10 renders the mirror eyebrow shape pattern via the rendering module 104 according to the adjusted position of the mirror feature points 67"-69".

The present disclosed example can implement the function of eyebrow modification and make the shaped eyebrows look natural effectively.

The above-mentioned are only preferred specific examples in the present disclosed example, and are not thence restrictive to the scope of claims of the present disclosed example. Therefore, those who apply equivalent changes incorporating contents from the present disclosed example are included in the scope of this application, as stated herein.

What is claimed is:

1. A method of auxiliary comparison of eyebrow shapes applied to a body information analysis apparatus, comprising following steps of:
    a) controlling an image capture module of the body information analysis apparatus to capture a face image;
    b) controlling a process unit of the body information analysis apparatus to execute a face analysis process on the face image for recognizing a plurality of eyebrow feature points of an eyebrow image on one side of the face image and a plurality of nose feature points of a nose image, wherein the eyebrow feature points respectively correspond to a plurality of different features of an eyebrow, the nose feature points respectively correspond to a plurality of different features of nose;
    c) calculating a symmetrical auxiliary line according to the nose feature points at the process unit;
    d) executing a mirror process on the eyebrow feature points based on the symmetrical auxiliary line for obtaining a plurality of mirror feature point, wherein the mirror feature points and the eyebrow feature points are respectively located at different sides of the symmetrical auxiliary line;
    e) connecting the mirror feature points to render the mirror eyebrow shape pattern;
    f) calculating a projection position of the mirror eyebrow shape pattern based on the symmetrical auxiliary line of the face image according to a plurality of positions of the eyebrow feature points of the eyebrow image at the process unit, wherein the projection position is located at another side of the face image referred to the symmetrical auxiliary line; and
    g) controlling a display module of the body information analysis apparatus to display the face image and display the mirror eyebrow shape pattern at the projection position simultaneously.

2. The method of auxiliary comparison of eyebrow shapes according to claim 1, wherein the step f) comprises following steps of:
    f1) calculating a plurality of first vertical distances between the eyebrow feature points and the symmetrical auxiliary line; and
    f2) configuring a plurality of positions of the mirror feature points to be located at another side of the symmetrical auxiliary line according to the first vertical distances, and calculating the projection position according to the configured positions of the mirror feature points, wherein a plurality of second vertical distances between the mirror feature points and the symmetrical auxiliary line are consistent with the first vertical distances, and each connection of each eyebrow feature point and each corresponded mirror feature point is perpendicular with the symmetrical auxiliary line.

3. The method of auxiliary comparison of eyebrow shapes according to claim 1, wherein the method of auxiliary comparison of eyebrow shapes further comprises a step g) before the step b), select one of the both sides of the face image according to a reference side selection command or a reference side selection operation; the step b) is configured to recognize the eyebrow image located at the selected side of the face image; the step d is configured to execute the mirror process on the eyebrow feature points of the eyebrow image located at the selected side.

4. The method of auxiliary comparison of eyebrow shapes according to claim 1, wherein the step b) is further performed to recognize a plurality of first eyebrow feature points of a first eyebrow image and a plurality of second eyebrow feature points of a second eyebrow image respectively located at both sides of the face image, establishing a first eyebrow data set according to the first eyebrow feature points, and establishing a second eyebrow data set according to the second eyebrow feature points, wherein three of the first eyebrow feature points respectively correspond to eyebrow head, eyebrow peak and eyebrow tail of one side of the eyebrow, and three of the second eyebrow feature points respectively correspond to eyebrow head, eyebrow peak and eyebrow tail of another side of the eyebrow.

5. The method of auxiliary comparison of eyebrow shapes according to claim 4, wherein the step d) is further performed to
    execute the mirror process to the first eyebrow data set based on the symmetrical auxiliary line for obtaining the mirror feature points;
    calculate an adjustment parameter set according to the mirror feature points and the second eyebrow data set, and adjust a plurality of positions of the mirror feature points according to the symmetrical auxiliary line and the adjustment parameter set, wherein the adjustment parameter set comprises a translation parameter, a rotation parameter and a scaling parameter;

the step e) is performed to render the mirror eyebrow shape pattern according to the adjusted positions of the mirror feature points.

6. The method of auxiliary comparison of eyebrow shapes according to claim 5, wherein the step f) is configured to calculate the projection position according to the adjusted positions of the mirror feature points.

7. A body information analysis apparatus, comprising:
an image capture module used to capture a face image;
a display module used to display the face image and display a mirror eyebrow shape pattern at a projection position simultaneously; and
a process unit electrically connected to the image capture module and the display module, the process unit comprising:
a face analysis module, the face analysis module executes a face analysis process on the face image for recognizing a plurality of eyebrow feature points of the eyebrow image on one side of the face image and a plurality of nose feature points of a nose image, wherein the eyebrow feature points respectively correspond to a plurality of different features of an eyebrow, and the nose feature points respectively correspond to a plurality of different features of a nose;
a mirror module used to execute a mirror process to the eyebrow feature points based on a symmetrical auxiliary line for obtaining a plurality of mirror feature points, wherein the mirror feature points and the eyebrow feature points are respectively located at the different sides of the symmetrical auxiliary line;
a calculation module used to calculate the symmetrical auxiliary line according to the nose feature points and calculate the projection position according to the symmetrical auxiliary line and a plurality of positions of the mirror feature points; and
a rendering module used to connect the mirror feature points to render the mirror eyebrow shape pattern.

8. The body information analysis apparatus according to claim 7, wherein the calculation module is configured to calculate a plurality of first vertical distances between the eyebrow feature points and the symmetrical auxiliary line, calculate the mirror feature points located at another side of the symmetrical auxiliary line according to the first vertical distances, and calculate the projection position according to the positions of the mirror feature points, wherein a plurality of second vertical distances between the mirror feature points and the symmetrical auxiliary line are consistent with the first vertical distances, and each connection of each eyebrow feature point and each corresponded mirror feature point is perpendicular to the symmetrical auxiliary line.

9. The body information analysis apparatus according to claim 7, wherein the body information analysis apparatus further comprises:
an input interface electrically connected to the process unit, the input interface being used to receive a reference side selection operation of selecting one of both sides of the face image; and
a wireless transmission module connected to an electronic device, the wireless transmission module being used to receive a reference side selection command of selecting one of both sides of the face image from the electronic device;
wherein the process unit recognizes the eyebrow feature points of the eyebrow image located at the selected side of the face image, and execute the mirror process on the eyebrow feature points of the eyebrow image located at the selected side.

10. The body information analysis apparatus according to claim 7, wherein
the face analysis module is used to recognize a plurality of first eyebrow feature points of a first eyebrow image and a plurality of second eyebrow feature points of a second eyebrow image respectively located at both sides of the face image, establish a first eyebrow data set according to the first eyebrow feature points, and establish a second eyebrow data set according to the second eyebrow feature points, wherein three of the first eyebrow feature points respectively correspond to eyebrow head, eyebrow peak and eyebrow tail of one side of the eyebrow, and three of the second eyebrow feature points respectively correspond to eyebrow head, eyebrow peak and eyebrow tail of another side of the eyebrow;
the mirror module is used to execute the mirror process to the first eyebrow data set based on the symmetrical auxiliary line for obtaining the mirror feature points;
the calculation module is used to calculate an adjustment parameter set according to the mirror feature points and the second eyebrow data set, adjusts a plurality of positions of the mirror feature points according to the symmetrical auxiliary line and the adjustment parameter set, and calculates the projection position according to the adjusted positions of the mirror feature points, wherein the adjustment parameter set comprises a translation parameter, a rotation parameter and a scaling parameter; and
the rendering module is used to render the mirror eyebrow shape pattern according to the adjusted positions of the mirror feature points.

* * * * *